United States Patent
Nile et al.

(10) Patent No.: US 7,084,204 B2
(45) Date of Patent: Aug. 1, 2006

(54) COATING FOR RUBBER GLOVES

(75) Inventors: Jeffery G. Nile, Alliance, OH (US);
Stanley J. Gromelski, Canton, OH (US); Paul Cacioli, Eltham South (AU); Richard L. Cox, Massillon, OH (US); E. Anthony Yu, Massillon, OH (US)

(73) Assignee: Ansell Healthcare Products LLC, Red Bank, NJ (US)

( * ) Notice: Subject to any disclaimer, the term of this patent is extended or adjusted under 35 U.S.C. 154(b) by 315 days.

(21) Appl. No.: 10/343,551

(22) PCT Filed: Jul. 31, 2001

(86) PCT No.: PCT/US01/23954

§ 371 (c)(1),
(2), (4) Date: Jul. 1, 2003

(87) PCT Pub. No.: WO02/10278

PCT Pub. Date: Feb. 7, 2002

(65) Prior Publication Data

US 2004/0010077 A1    Jan. 15, 2004

Related U.S. Application Data

(60) Provisional application No. 60/222,351, filed on Aug. 1, 2000.

(51) Int. Cl.
*C08L 33/08* (2006.01)
*C08L 75/00* (2006.01)
*B05D 1/18* (2006.01)
*B28B 7/36* (2006.01)

(52) U.S. Cl. .................. 524/591; 524/819; 524/568; 427/409.1; 264/338

(58) Field of Classification Search .............. 524/591, 524/819; 427/407.1; 264/338
See application file for complete search history.

(56) References Cited

U.S. PATENT DOCUMENTS

| | | |
|---|---|---|
| 3,634,184 A | 1/1972 | Wang |
| 3,832,214 A | 8/1974 | Wang |
| 3,856,561 A | 12/1974 | Esemplare et al. |
| 3,973,563 A | 8/1976 | Green et al. |
| 4,119,602 A | 10/1978 | Isgur et al. |
| 4,143,109 A | 3/1979 | Stockum |
| 4,499,154 A | 2/1985 | James et al. |
| 4,517,228 A | 5/1985 | Mateijka et al. |
| 4,589,940 A | 5/1986 | Johnson |
| 4,935,260 A | 6/1990 | Shlenker |
| 5,036,210 A | 7/1991 | Goodman |
| 5,084,514 A | 1/1992 | Szczechura et al. |
| 5,088,125 A | 2/1992 | Ansell et al. |
| 5,089,205 A | 2/1992 | Huang et al. |
| 5,173,525 A | 12/1992 | De Servi et al. |
| 5,182,784 A | 1/1993 | Hager et al. |
| 5,354,521 A | 10/1994 | Goodman |
| 5,428,087 A | 6/1995 | Petit |
| 5,571,219 A | 11/1996 | Gorton |
| 5,601,870 A | 2/1997 | Haung et al. |
| 5,612,083 A | 3/1997 | Haung et al. |
| 5,620,738 A | 4/1997 | Fan et al. |
| 5,700,585 A | 12/1997 | Lee |
| 5,716,701 A * | 2/1998 | Skoglund et al. ..... 428/355 AC |
| 5,741,828 A | 4/1998 | Stoy et al. |
| 5,881,386 A | 3/1999 | Horwege et al. |
| 5,922,482 A | 7/1999 | De Ricci et al. |
| 5,977,223 A | 11/1999 | Ryan et al. |
| 5,993,923 A | 11/1999 | Lee |
| 6,016,570 A | 1/2000 | Vande Pol et al. |

FOREIGN PATENT DOCUMENTS

| | | |
|---|---|---|
| EP | 600801 A1 * | 6/1994 |
| EP | 0 418 807 | 2/1995 |
| EP | 0 773 455 | 5/1997 |
| JP | 61218665 A * | 9/1986 |
| WO | WO 96/25279 A1 | 8/1996 |
| WO | WO 02/10278 | 2/2002 |

OTHER PUBLICATIONS

M. Rouques, Flexible Magnetic Materials, Engineers' Digest, Feb. 1966, pp. 101-103, vol. 27 No. 2.
Copy of International Search Report for PCT Application No. PCT/US01/23954.

* cited by examiner

*Primary Examiner*—Tae H. Yoon
(74) *Attorney, Agent, or Firm*—Diehl Servilla LLC; Glen M. Diehl; Karen M. Whitney

(57) ABSTRACT

A composition for a damp hand donnable glove using a novel coating. The novel coating results in the formation of domains of variable size and height. The coating has a polyurethane polymer, an aqueous wax dispersion and a surfactant.

23 Claims, 16 Drawing Sheets

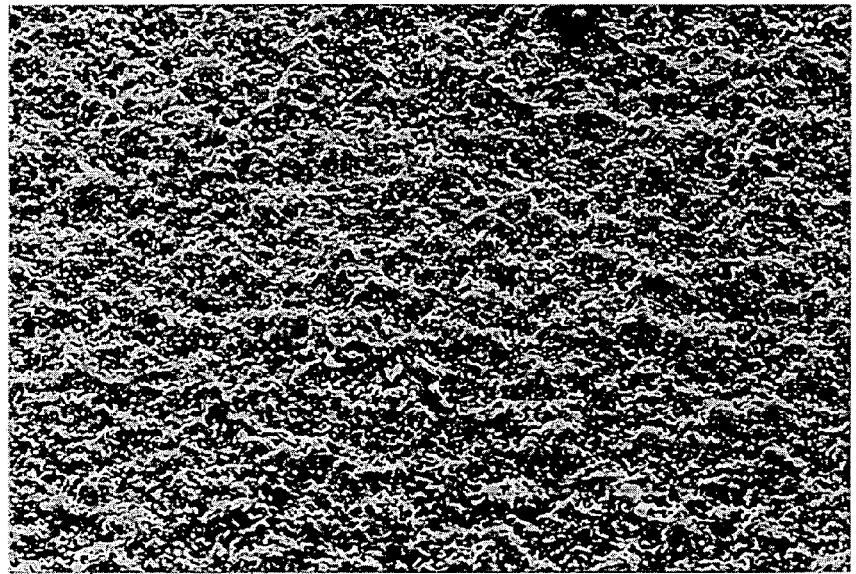
R ↗  R ↗   FIG. 15
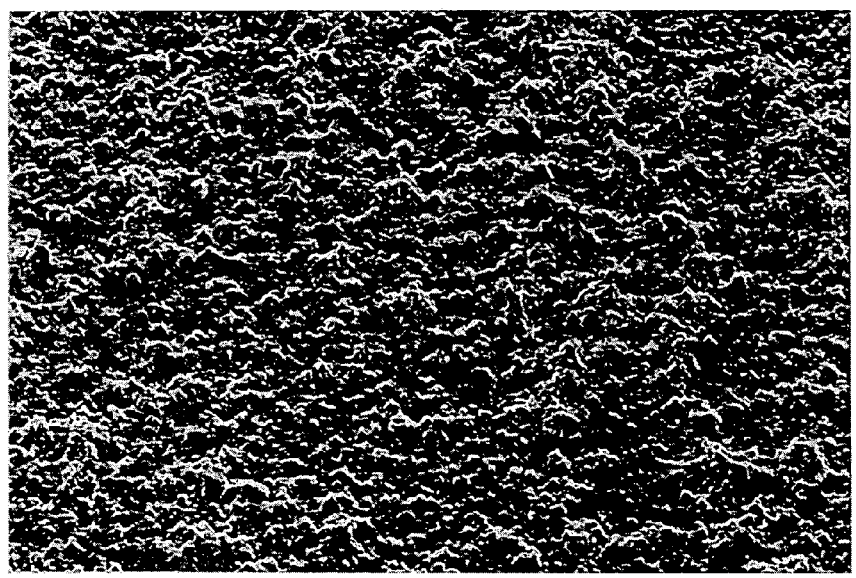
FIG. 16

COATING FOR RUBBER GLOVES

FIELD OF THE INVENTION

This invention relates to a damp hand donnable glove produced using a novel coating formulation that yields domains variable in size and height on the surface of the glove.

BACKGROUND OF THE INVENTION

Medical, surgical and other gloves, made of a rubber latex, are typically manufactured so that these rubber articles tightly conform to the human hand. Because of this tight fit, such gloves are typically lubricated on the skin-contacting inner surface in order to facilitate donning of the articles. The standard lubricant utilized for this purpose is dusting powder, e.g., cross-linked corn starch. However, it is also desirable to have a glove that does not rely on an internal surface lubricant for donnability. Therefore, attempts have been made to eliminate the internal surface lubricants while at the same time providing an inner glove surface that will aid in the donning of the glove.

Various methods have been proposed to provide slip finishes on rubber articles of this type. For example, the surface of a rubber glove can be halogenated with bromine or chlorine to make it slippery. This treatment, however, has certain disadvantages well-known in the art and typically does not produce a glove that is easier to don that a glove internally coated with dusting powder. One prior art glove provides a slip finish comprising a rubber latex blended with a resin latex. This approach, while lowering the coefficient of friction of the rubber glove, does not significantly improve donnability. Yet another prior art glove is made with granular material deposited on the inner, skin-contacting surface of a single-layer vinyl or silicone glove in order to reduce the frictional contact between the glove layer and the skin of the wearer and, thus, to aid in the donning of the glove. Use of this glove, however, results in the granular material being abraded from the inner glove surface thus generating loose particulate matter. It is therefore desirable to have a glove with improved donnability that does not generate loose particulate matter. It is further desirable to have damp-hand donnable glove having domain formations on the glove surface that are produced during the manufacturing process.

SUMMARY OF THE INVENTION

In one embodiment, the present invention provides a damp-hand donnable glove produced using a novel coating formulation that yields domains variable in size and height on the surface of the glove. In another embodiment, the present invention also provides a formulation useful in producing gloves in a conventional dipping process where the gloves so made exhibit domain formation. In still another embodiment, the present invention further provides a process for the manufacture of a polymeric coating useful in the generation of domain formation on gloves made using the polymeric coating.

DESCRIPTION OF THE DRAWINGS

FIG. 15 is a scanning electron photomicrograph of a glove surface made according to the fifth embodiment of the present invention at a 0% stretch.

FIG. 16 is a scanning electron photomicrograph of a glove surface made according to the fifth embodiment of the present invention at a 500% stretch.

DETAILED DESCRIPTION OF THE INVENTION

Figure 1:
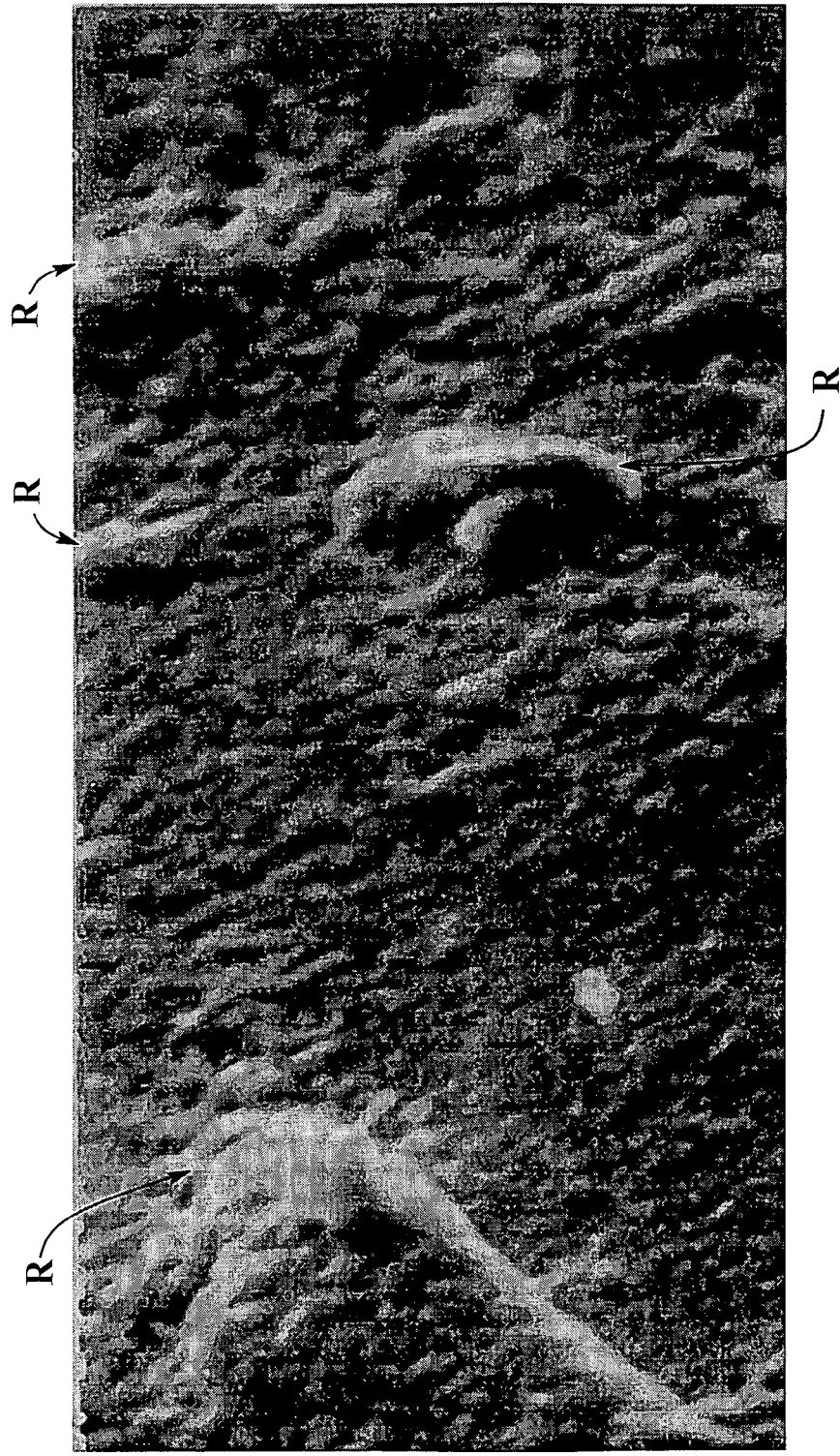
FIG. 1 is a scanning electron photomicrograph of a glove surface made according to the principles of a first embodiment of the present invention.

There is provided according to the principles of the present invention, an aqueous-based polymeric coating including, in one embodiment of the present invention, water, a polyurethane dispersion, a sodium polymethacrylate solution and a polyvinyl chloride latex is prepared by first mixing the water, the polyurethane dispersion, and the polyvinyl chloride latex, to form a first mixture. Then, the sodium polymethacrylate is metered into the first mixture to form the coating of the present invention. Metered addition of the sodium polymethacrylate, under mixing, facilitates agglomeration of the polyvinyl chloride. Agglomeration of the polyvinyl chloride enhances the formation of domains on a glove surface.

According to the principles of the present invention, it has been demonstrated that the formation of domains on the interior of the glove surface greatly enhances donnability. The domains reduce the coefficient of friction between the interior glove surface and the skin, thus enhancing wet-hand donnability.

As but one example of a coating made according to the principles of the present invention, table 1 below presents a formulation useful as coating for the formation of domains on a glove surface.

TABLE 1

| Item | Ingredient | % Solids (w/w) | % Used |
|------|------------|----------------|--------|
| 1 | Water | — | Balance |
| 2 | Solucote | 35 | 3.0 |
| 3 | VYCAR 576 | 58 | 2.5 |
| 4 | GOOD-RITE K-765 | 30 | 0.5 |

VYCAR 576 is plasticized polyvinyl chloride latex, available from BF Goodrich Specialty Chemicals, Cleveland, Ohio. VYCAR 576 is an emulsion including water, polyvinyl chloride solids, di(2-ethylhexyl) phthalate, and an anionic synthetic emulsifier. GOOD-RITE K-765 is a sodium polymethacrylate solution available from BF Goodrich Specialty Chemicals, Cleveland, Ohio. GOOD-RITE K-765 is an aqueous solution of a sodium polymethacrylate having a molecular weight, by conventional gel permeation chromatographic methods, of about 30,000. Solucote is a conventional polyurethane dispersion available from Soluol Chemical Company, Warwick, R.I.

The percentages provided in table 1 are illustrative of but one embodiment of the present invention. The solids contents of the plasticized polyvinyl chloride latex, the sodium polymethacrylate solution, and the polyurethane dispersion may be varied over the ranges of concentrations found in commercially available products. The concentration of these components in the coating of the present invention may accordingly be varied. However, according to the principles of the present invention, a polyurethane dispersion at from about 0.1% (w/w) to about 10% (w/w), a plasticized polyvinyl chloride at from about 0.1% (w/w) to about 10% (w/w), and a sodium polymethacrylate solution at from about 0.1% (w/w) to about 10% (w/w), each based on the total coating weight, may be used in making the coating of the present invention.

A process for making a glove, using a coating of the present invention, is described as follows. A standard latex coagulant, well known by those of ordinary skill in the art, is applied to a clean ceramic former and dried. A standard latex coagulant generally comprises an aqueous solution of a divalent cationic metal salt, a surfactant or wetting agent, and a release powder. The typical divalent metal salt includes, but is not limited to calcium nitrate and the typical class of surfactant or wetting agent is nonionic while the typical release powder is calcium carbonate. Of course, alcohols may be used in lieu of water, other divalent and trivalent cationic metal salts can be used, other surfactant types may be used that are salt stable and other release powders include, but are not limited to starch and talc.

The former is dipped into compounded latex to form a rubber film in the shape of a hand. The gelled latex is leached in water. The leached film enters the coating solution of the present invention. A dry time is incorporated following the coating solution to promote domain formation. The glove is cured and then optionally silicone coated to enhance damp hand donnability.

Figure 2:
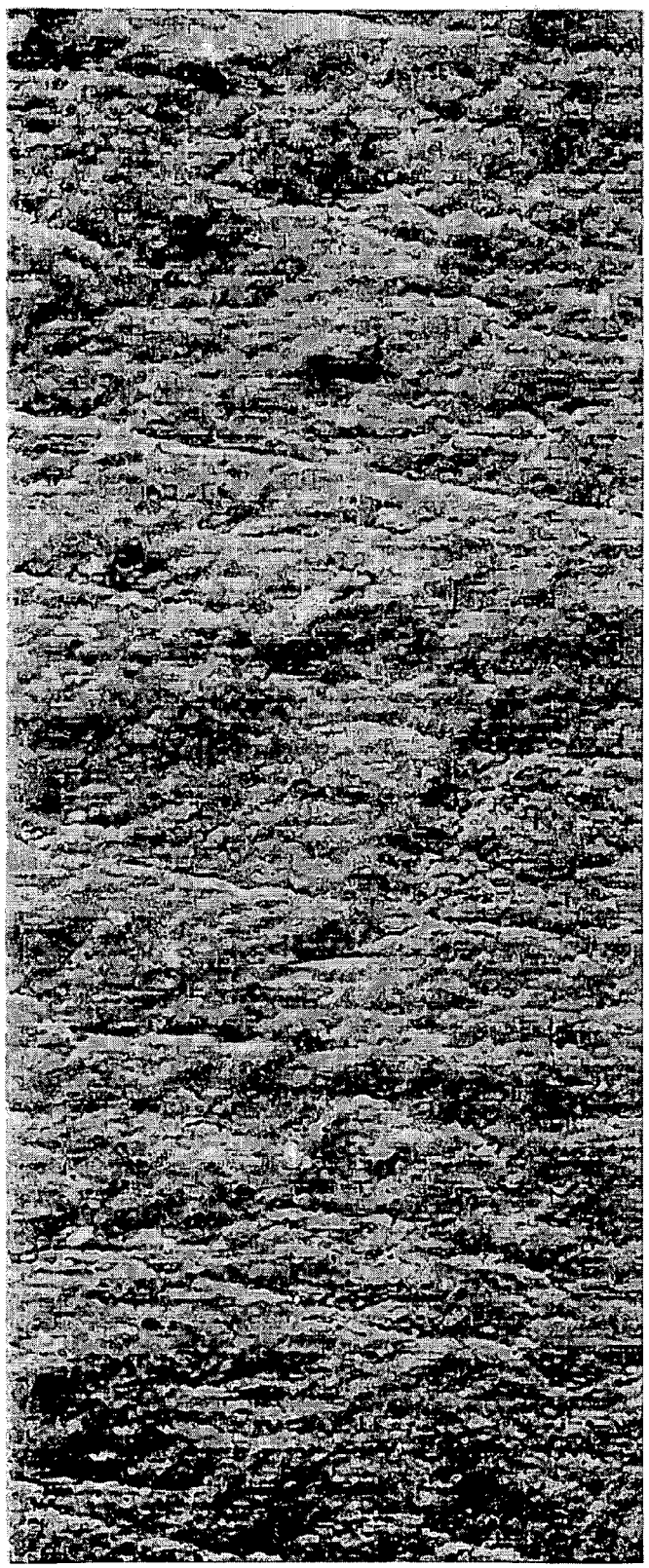
FIG. 2 is a scanning electron photomicrograph of a glove surface of the prior art.

FIG. 1 illustrates a scanning electron photomicrograph of a glove surface made in one embodiment of the present invention. Ridges R can be clearly seen in FIG. 1. These ridges R define the domains on the glove surface. FIG. 2, on the other hand, illustrates a scanning electron photomicrograph of a glove surface of the prior art. A comparison of FIGS. 1 and 2 demonstrates the lack of domain formation on the surface of the glove of the prior art as compared to the glove surface of the present invention.

In a second embodiment of the present invention, there is provided an aqueous based polymeric coating that includes water, a styrene acrylic emulsion, a nonionic surfactant, an ionic surfactant, an aqueous wax dispersion and an amount of 10% solution of potassium hydroxide. In this particular embodiment of the present invention, the styrene acrylic emulsion is used as a substitute for the polyurethane used in the first embodiment of the donning coating formulation.

The second embodiment of a donning coating made according to the principles of the present invention, presenting a formulation useful as coating for the formation of domains on a glove surface is set forth in the table below:

TABLE 2

| Item | Ingredient | % Solids (w/w) | % Used |
|------|------------|----------------|--------|
| 1 | Water | — | Balance |
| 2 | Rhoplex TR-3388 | 44 | 3.0 |
| 3 | Aquamat 213 | 30 | 2.0 |
| 4 | Igepal CO-897 | 70 | 0.05 |
| 5 | Darvan WAQ | 66 | 0.03 |
| 6 | KOH (10%) | 10 | 0.12 |

Rhoplex TR-3388, a polymer selected to substitute the polyurethane latex in the donning coating, is a styrene acrylic emulsion, available from Rohm & Haas. Aquamat 213 is an aqueous wax dispersion. Igepal CO-897 is a nonionic surfactant and Darvan WAQ is an anionic surfactant used as an emulsion stabilizer.

The percentages set forth in Table 2 are merely illustrative of but one embodiment of the present invention. The solids content of the emulsion, the aqueous wax dispersion, both the nonionic and anionic surfactants as well as the potassium hydroxide may be varied over the ranges of concentrations found in commercially available products. Waxes may be synthetic or natural. The natural waxes that may be generally used include montan, carnauba, bees wax, bayberry-myrtle, candelialla, caranday, castor bean, asparto-grass, Japan, ouricury, retamo-ceri, mimbi, schlack, spermaceti, sugar-cane and wool lanolin. Synthetic waxes generally include polyethylene and modified polyethylenes, polypropylene and modified polypropylenes, and hydrogen-based materials.

The concentrations of these components in the coating of the second embodiment of the present invention may accordingly be varied. However, according to the principles of the second embodiment of the present invention, an emulsion from about 0.1% (w/w) to about 10% (w/w), an aqueous wax dispersion of from about 0.1% (w/w) to about 10% (w/w), a nonionic surfactant from about 0.01% (w/w) to about 0.1% (w/w), an anionic surfactant from about 0.01% to about 0.1% (w/w) and an amount of potassium hydroxide from about 0.01% to about 1.0% (w/w), each based on the total coating weight, may be used in making the coating of the present invention.

Figure 3:
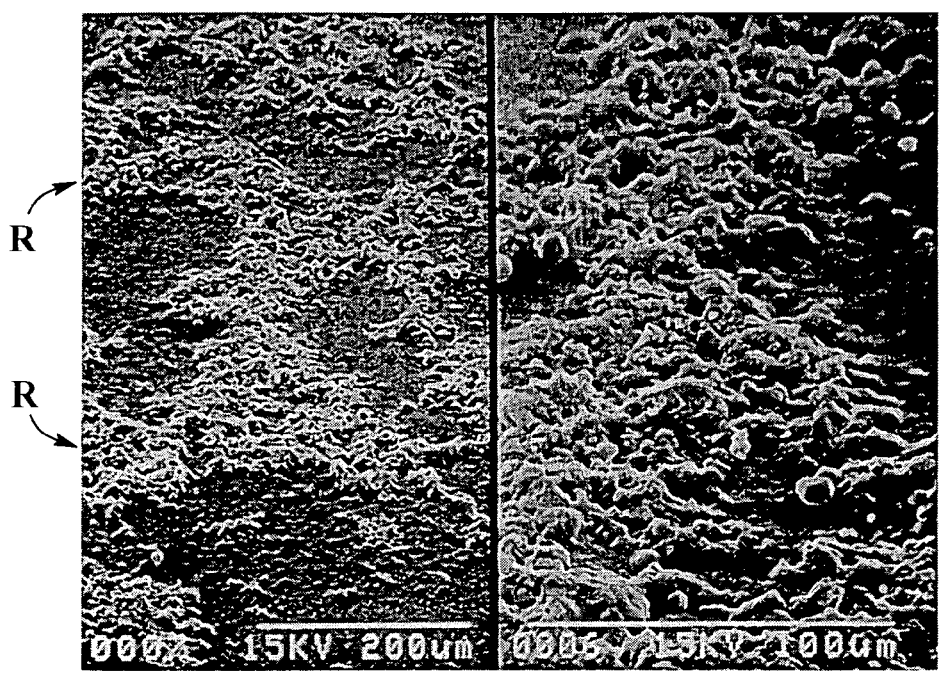
FIG. 3 is a scanning electron photomicrograph of a glove surface made according to a second embodiment of the present invention.
Figure 4:
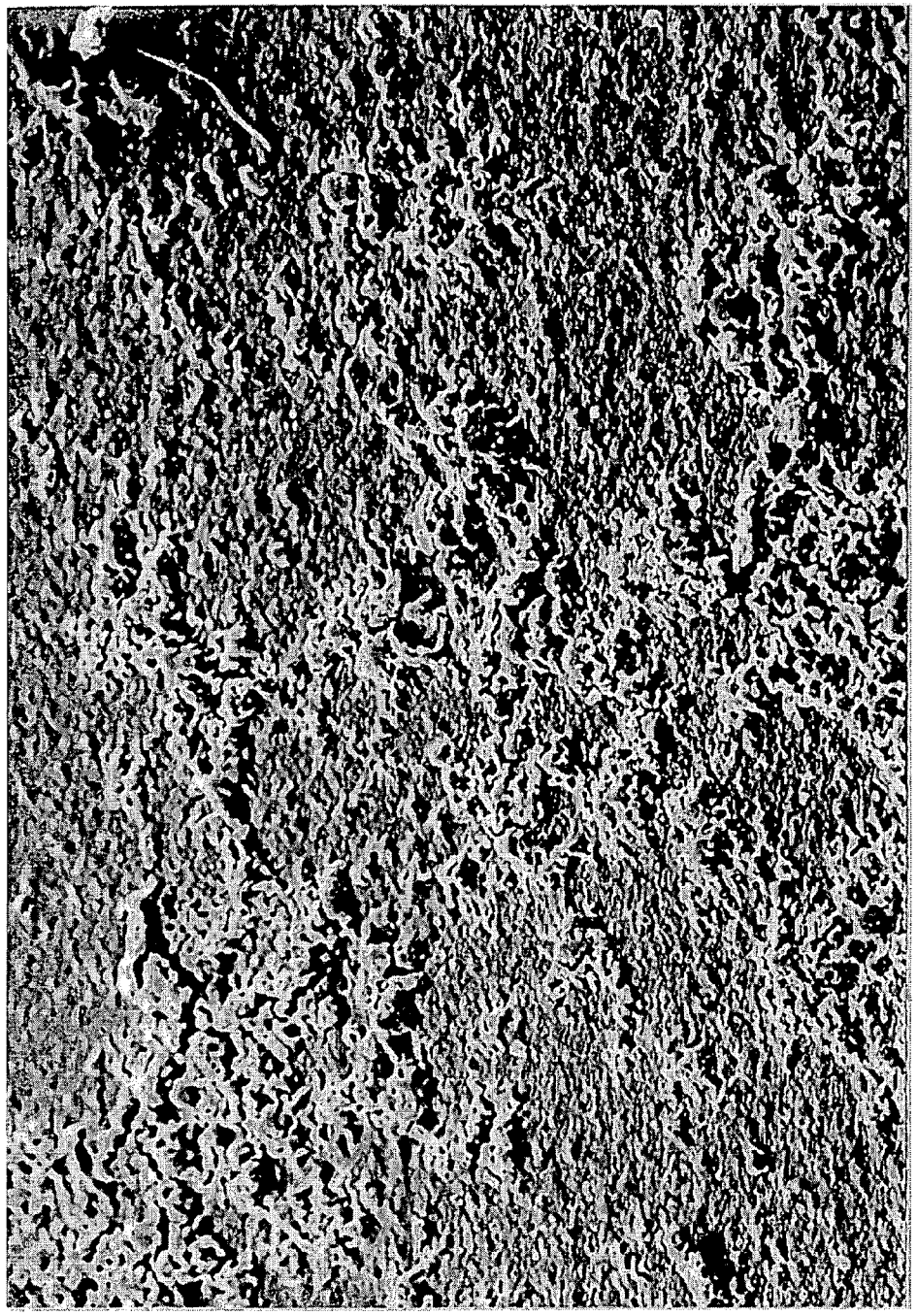
FIG. 4 is a scanning electron photomicrograph of a glove surface made according to the second embodiment of the present invention at a 0% stretch.
Figure 5:
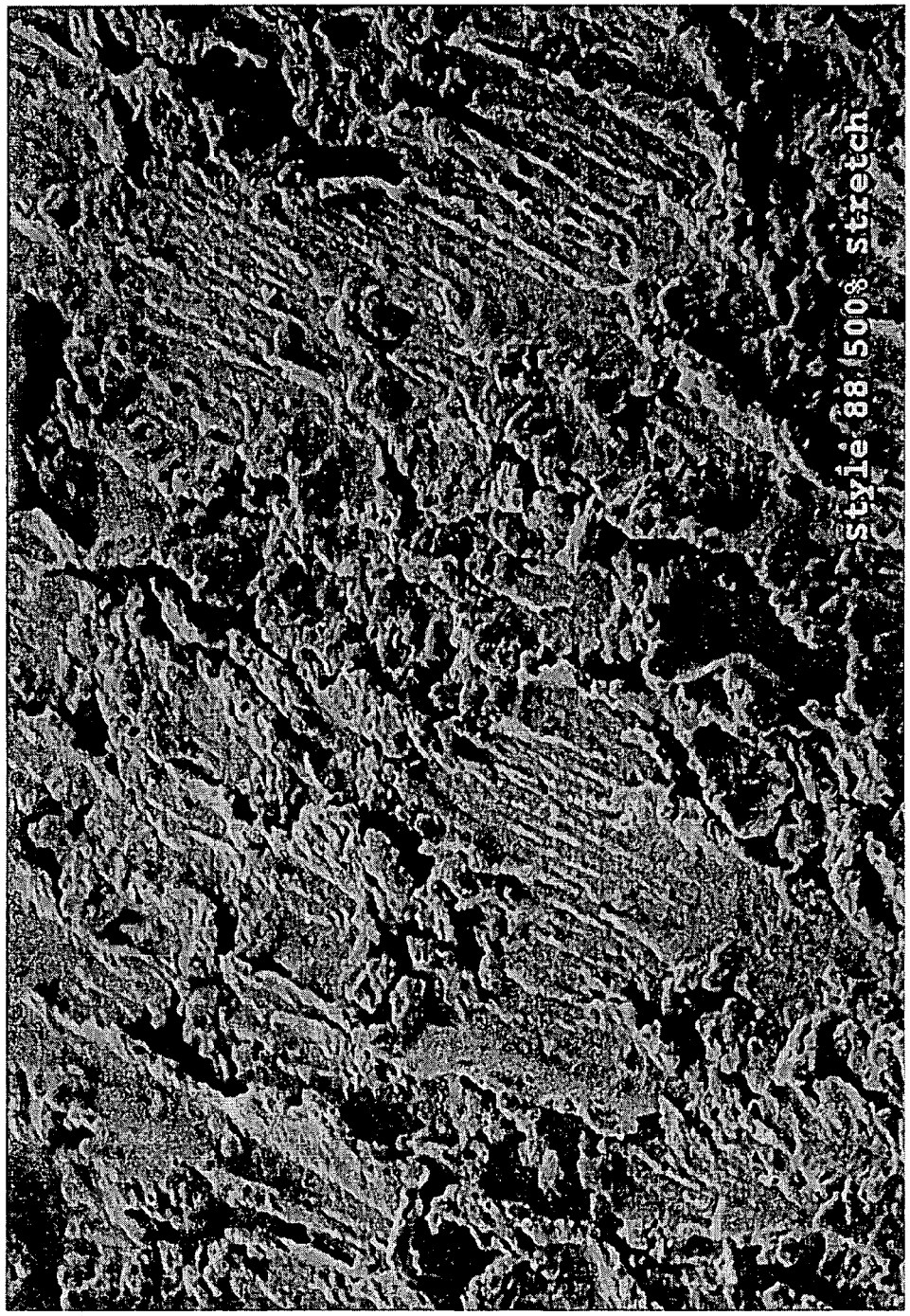
FIG. 5 is a scanning electron photomicrograph of a glove surface made according to the second embodiment of the present invention at a 500% stretch.
Figure 6:
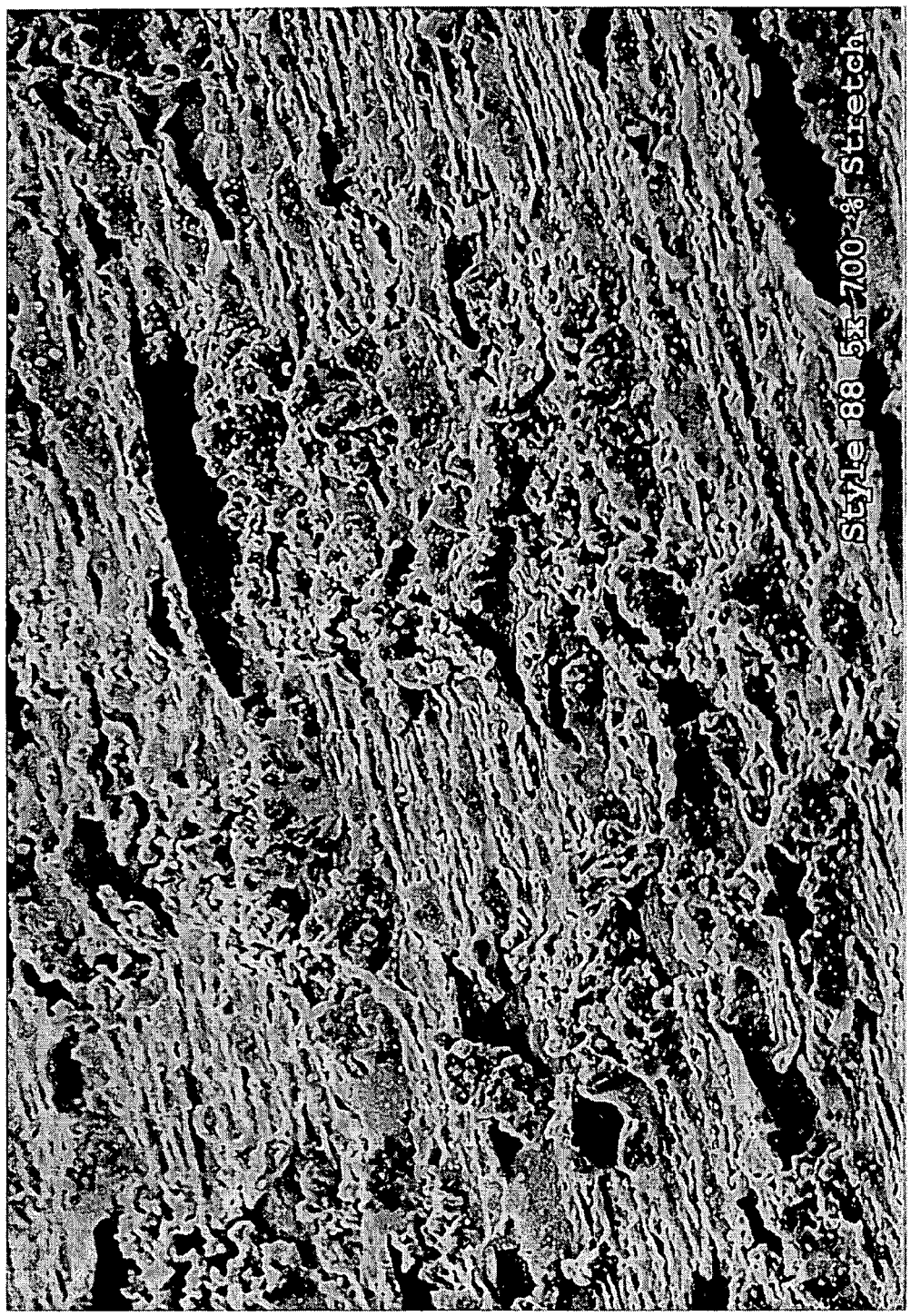
FIG. 6 is a scanning electron photomicrograph of a glove surface made according to the second embodiment of the present invention at 5×700%.
Figure 7:
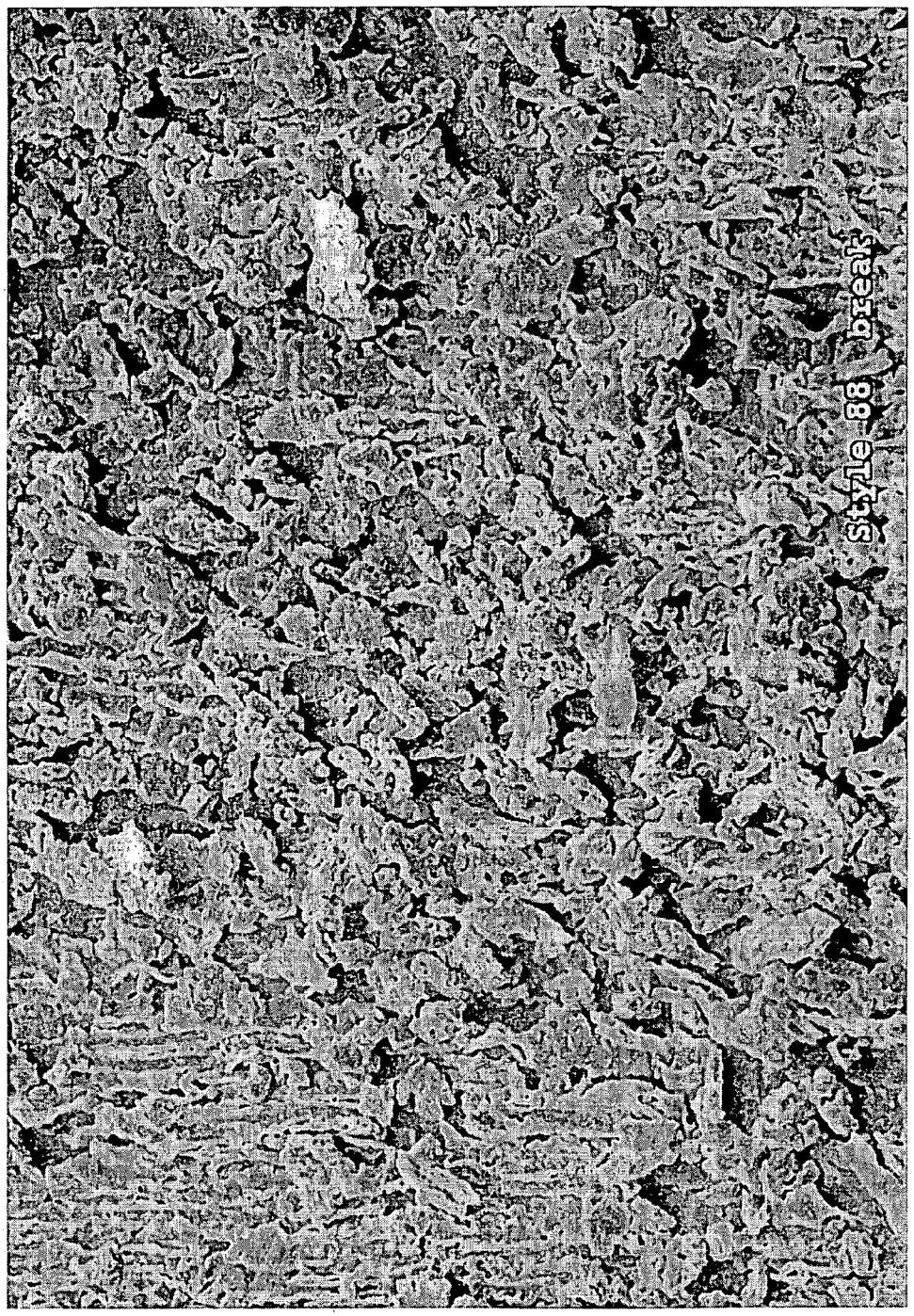
FIG. 7 is a scanning electron photomicrograph of a glove surface made according to the second embodiment of the present invention after a break.

FIG. 3 illustrates a scanning electron photomicrograph of a glove surface made in the second embodiment of the present invention. Like FIG. 1, ridges R can clearly be seen, the ridges R defining the domains on the glove surface. FIGS. 4–7 illustrates a scanning electron photomicrograph of the glove surface from a 0% stretch through a series of stretches continuing to the breaking point as illustrated in FIG. 7. As is shown, the domains on the glove surface remain even as the glove is stretched to the breaking point.

In a third embodiment of the present invention, there is provided an aqueous based polymeric coating that includes water, a styrene acrylic emulsion and a surfactant. In this particular embodiment of the present invention, the styrene acrylic emulsion, or any other emulsion known by those skilled in the art, may be used as a substitute for the polyurethane used in the first embodiment in the donning coating formulation.

The third embodiment of a donning coating made according to the principles of the present invention, presenting a formulation useful as coating for the formation of domains on a glove surface is set forth in the table below:

TABLE 3

| Item | Ingredient | % Solids (w/w) | % Used |
| --- | --- | --- | --- |
| 1 | Water | — | Balance |
| 2 | Rhoplex TR-3388 | 44 | 2.826 |
| 3 | Triton X-114 | 100 | 0.02 |

Rhoplex TR-3388, a polymer selected as a substitute for a polyurethane latex in this embodiment of the present invention of the donning coating, is a styrene acrylic emulsion, available from Rohm & Haas. Triton X-114 is a surfactant that is added to act as a stabilizer for the Rhoplex TR-3318. The surfactant assists in the formation of domains on the glove surface and in improving adhesion.

The percentages set forth in Table 3 are merely illustrative of but one embodiment of the present invention. The solids content of the emulsion and the surfactant may be varied over the ranges of concentrations found in commercially available products. The concentration of these components in the coating of the third embodiment of the present invention may accordingly be varied. However, according to the principles of the third embodiment of the present invention, an emulsion from about 0.1% (w/w) to about 10% (w/w) and a surfactant from about 0.01% (w/w) to about 0.1% (w/w), each based on the total coating weight, may be used in making the coating of the present invention.

Figure 8:
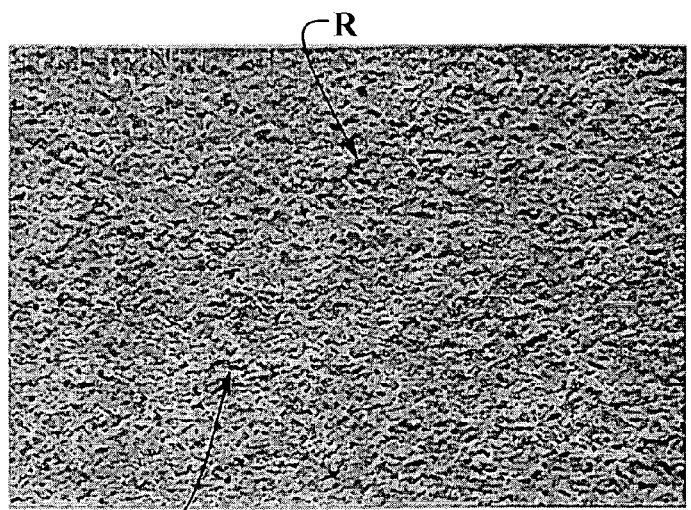
FIG. 8 is a scanning electron photomicrograph of a glove surface made according to a third embodiment of the present invention at a 0% stretch.
Figure 9:
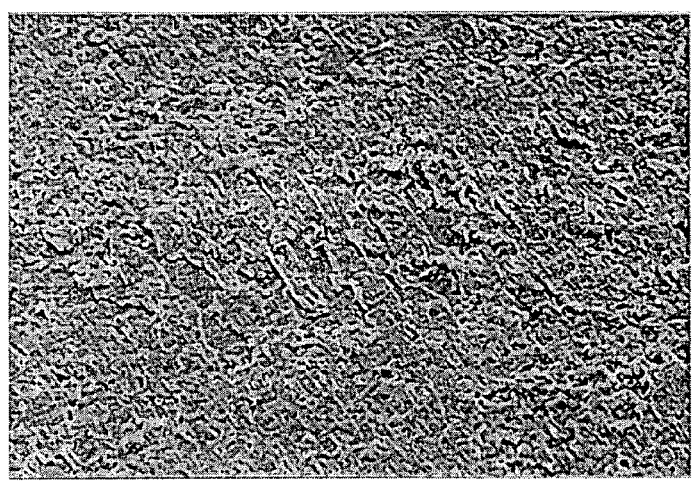
FIG. 9 is a scanning electron photomicrograph of a glove surface made according to the third embodiment of the present invention at 5×700%.
Figure 10:
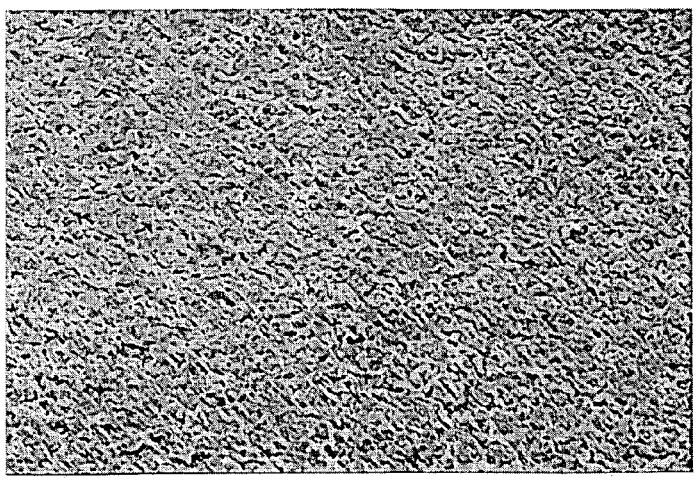
FIG. 10 is a scanning electron photomicrograph of a glove surface made according to the third embodiment of the present invention after break.
Figure 11:
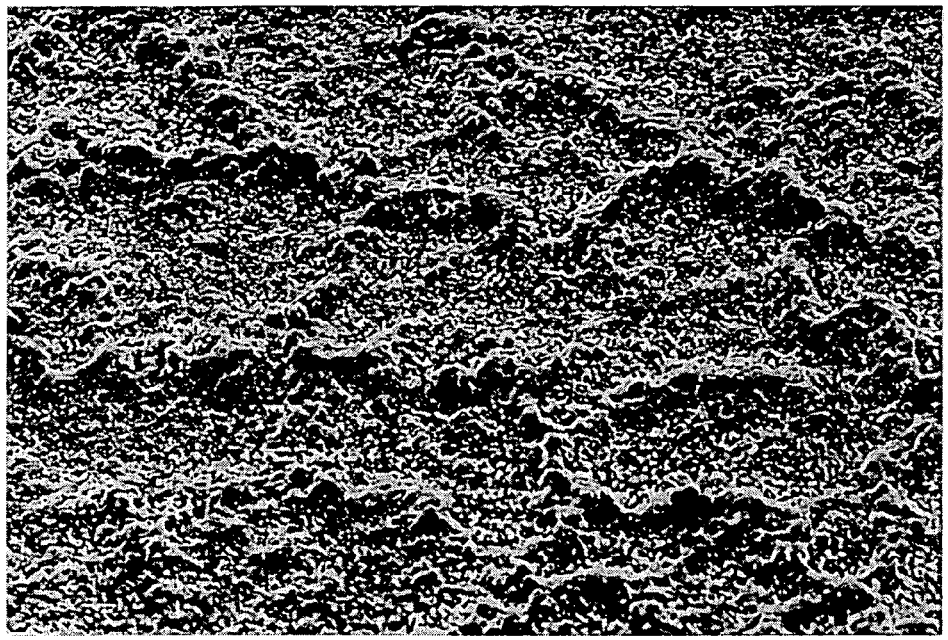
FIG. 11 is a scanning electron photomicrograph of a glove surface made according to the fourth embodiment of the present invention at a 0% stretch.
Figure 12:
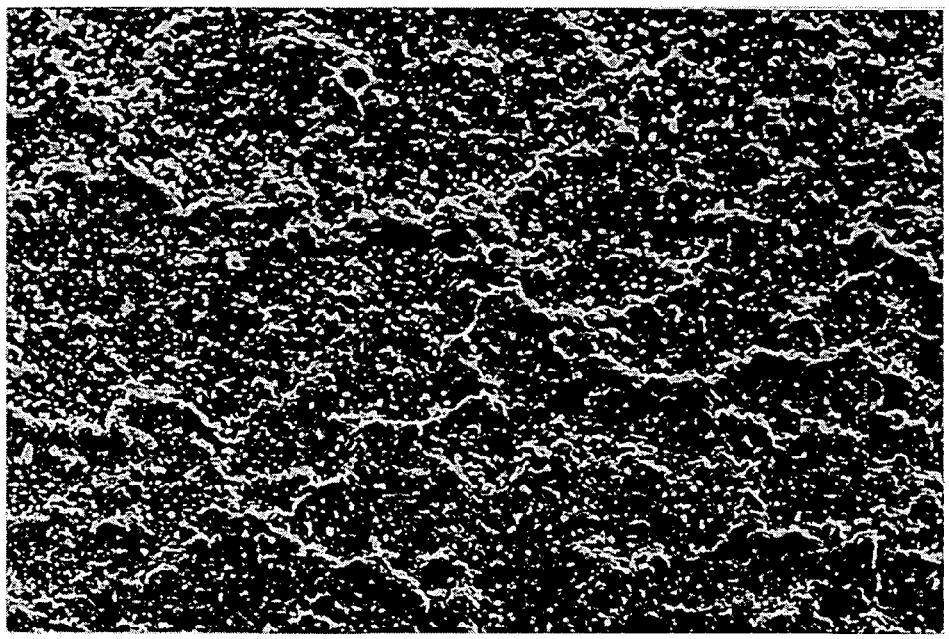
FIG. 12 is a scanning electron photomicrograph of a glove surface made according to the fourth embodiment of the present invention at a 500% stretch.
Figure 13:
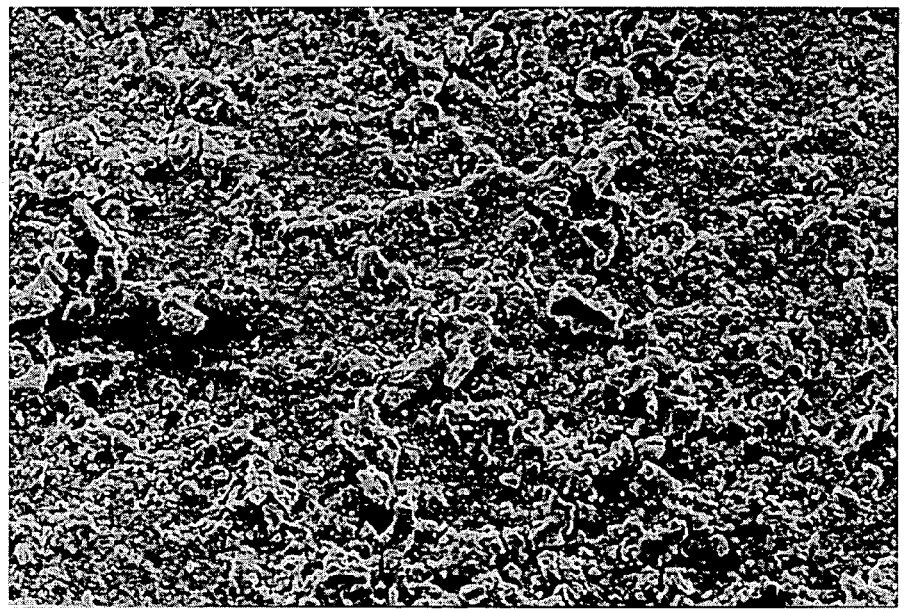
FIG. 13 is a scanning electron photomicrograph of a glove surface made according to the fourth embodiment of the present invention at 5×700%.
Figure 14:
FIG. 14 is a scanning electron photomicrograph of a glove surface made according to the fourth embodiment of the present invention after break.
Figure 17:
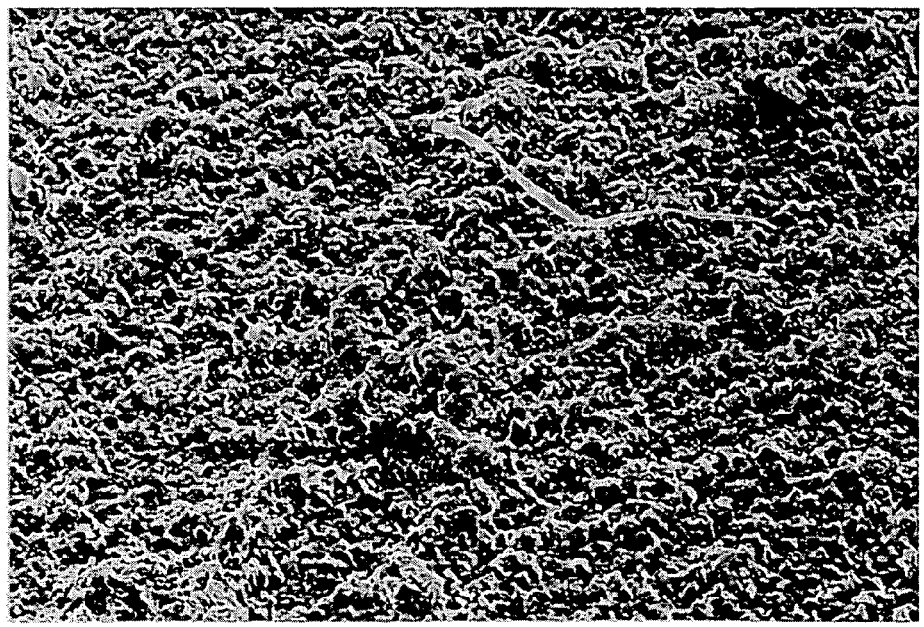
FIG. 17 is a scanning electron photomicrograph of a glove surface made according to the fifth embodiment of the present invention at 5×700%.

FIG. 8 illustrates a scanning electron photomicrograph of a glove surface made according to the third embodiment of the present invention. Ridges R can be seen, the ridges R defining the domains on the glove surface. FIGS. 8–10 illustrates scanning electron photomicrographs of the glove surface from a 0% stretch through a series of stretches continuing to the breaking point as illustrated in FIG. 10. As is shown, the domains on the glove surface remain even as the glove is stretched to the breaking point.

Another process for making a glove, using a coating of the present invention is set forth below. A standard coagulant, well known by those of ordinary skill in the art, is applied to a clean ceramic former and dried. The former is dipped into compounded latex to form a rubber film in the shape of a hand. The gelled latex is then leached in water. The latex film is then normally primed with aluminum sulfate before being dipped into the donning coating. For the experiments set forth below, the latex film is not primed by the aluminum sulfate, but instead is dipped into the donning coating without being primed. A dry time is then provided following the application of the donning coating to promote domain formation. The glove is then cured and silicone coated to enhance damp hand donnability.

FIGS. 11–14 illustrate the domain formations of a coating having water, Solucote 1088, Aquamat 213, Igepal CO-897, Darvan WAQ and an amount of potassium hydroxide on the latex film that has not been primed with aluminum sulfate. FIGS. 11–14 also illustrate some amount of delamination as the film is stretched to its breaking point.

Accordingly, there is provided, in a fourth embodiment of the present invention, water, a polyurethane dispersion, an aqueous wax dispersion, a nonionic surfactant, an anionic surfactant and potassium hydroxide. In this particular embodiment of the present invention, the amount of polyurethane dispersion is increased while the wax dispersion remains approximately constant.

The fourth embodiment of a donning coating made according to the principles of the present invention, presenting a formulation useful as coating for the formation of domains on a glove surface is set forth in the table below:

TABLE 4

| Item | Ingredient | % Solids (w/w) | % Used |
| --- | --- | --- | --- |
| 1 | Water | — | Balance |
| 2 | Solucote 1088 | 35 | 4.0 |
| 3 | Aquamat 213 | 30 | 2.0 |
| 4 | Igepal CO-897 | 70 | 0.05 |
| 5 | Darvan WAQ | 66 | 0.03 |
| 6 | KOH (10%) | 10 | 0.12 |

Solucote 1088 is a conventional polyurethane dispersion available from Solvol Chemical Company, Warwick, R.I. Aquamat 213 is an aqueous wax dispersion that is susceptible to suponification. Igepal CO-897 is a nonionic surfactant and Darvan WAQ is an anionic surfactant used as a stabilizer.

The percentages set forth in Table 4 are merely illustrative of but one embodiment of the present invention. The solids content of the polyurethane dispersion, the aqueous wax dispersion and both the nonionic and anionic surfactants, and the potassium hydroxide, may be varied over the ranges of concentrations found in commercially available products. The concentrations of these components in the coating of the fourth embodiment of the present invention may be varied. However, according to the principles of the fourth embodiment of the present invention, a polyurethane dispersion from about 0.1% (w/w) to about 10% (w/w), an aqueous wax dispersion of from about 0.1% (w/w) to about 10% (w/w), a nonionic surfactant from about 0.01% (w/w) to about 0.1% (w/w), an anionic surfactant from about 0.01% to about 0.1% (w/w) and an amount of potassium hydroxide from about 0.01% to about 1.0% (w/w), each based on the total coating weight, may be used in making the coating of the present invention. It should be evident to those of ordinary skill in the art that while specific examples of the components of the coating of the present invention have been provided, equivalents of these components are within the scope of this disclosure.

Figure 18:
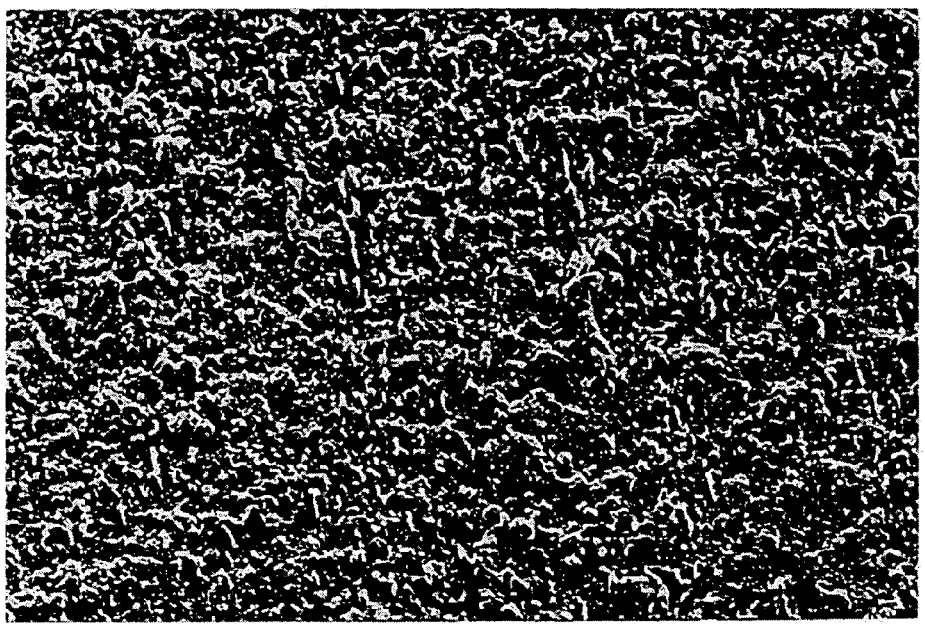
FIG. 18 is a scanning electron photomicrograph of a glove surface made according to the fifth embodiment of the present invention after break.
Figure 19:
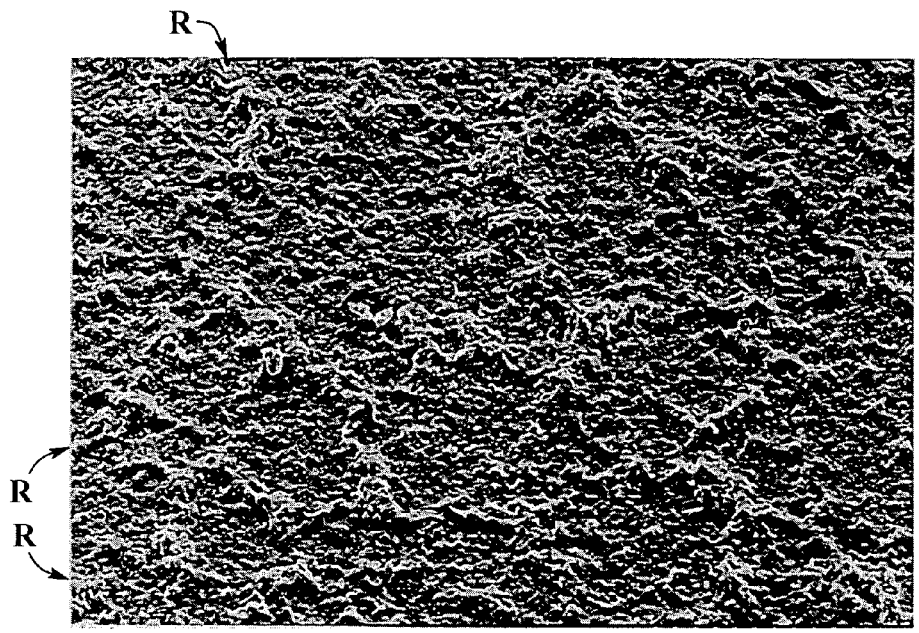
FIG. 19 is a scanning electron photomicrograph of a glove surface made according to the sixth embodiment of the present invention at a 0% stretch.
Figure 20:
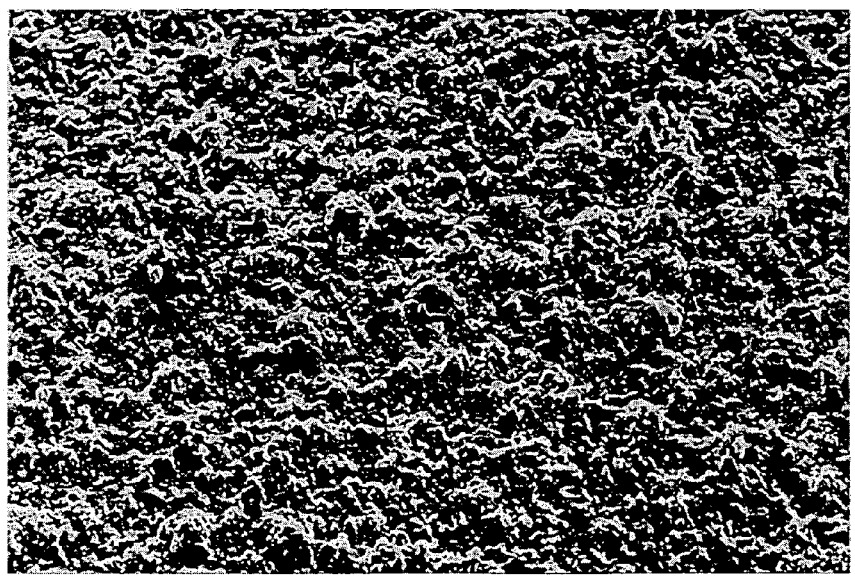
FIG. 20 is a scanning electron photomicrograph of a glove surface made according to the sixth embodiment of the present invention at a 500% stretch.
Figure 21:
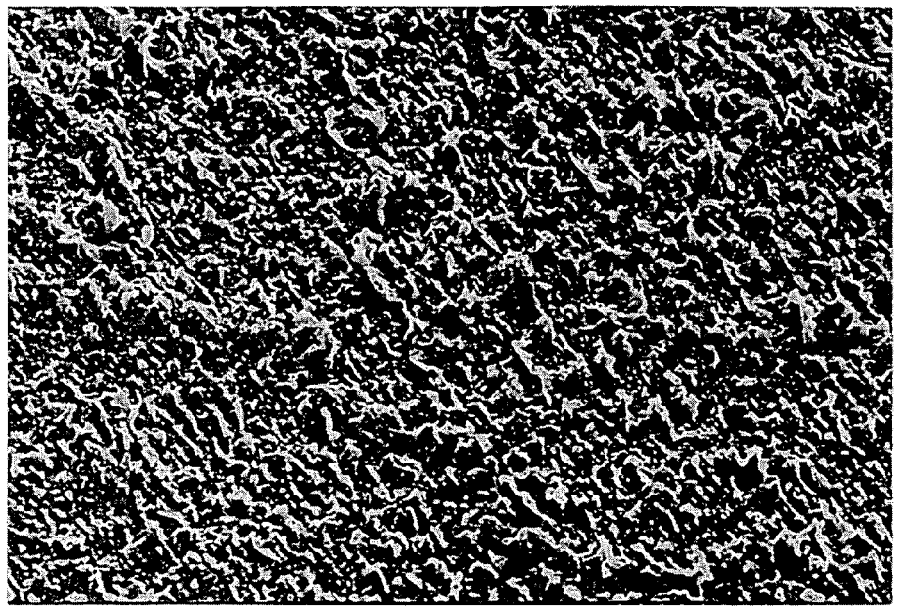
FIG. 21 is a scanning electron photomicrograph of a glove surface made according to the sixth embodiment of the present invention at 5×700%.
Figure 22:
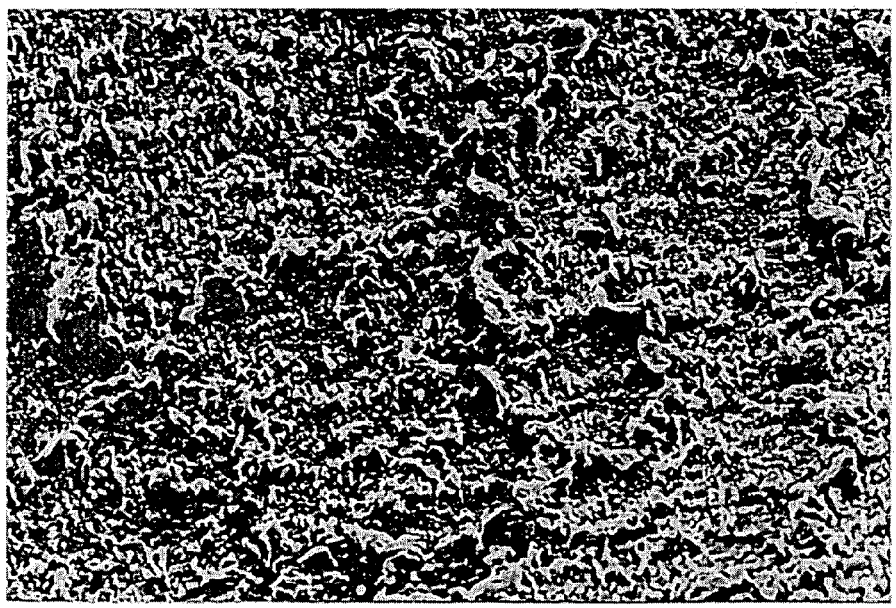
FIG. 22 is a scanning electron photomicrograph of a glove surface made according to the sixth embodiment of the present invention after break.
Figure 23:
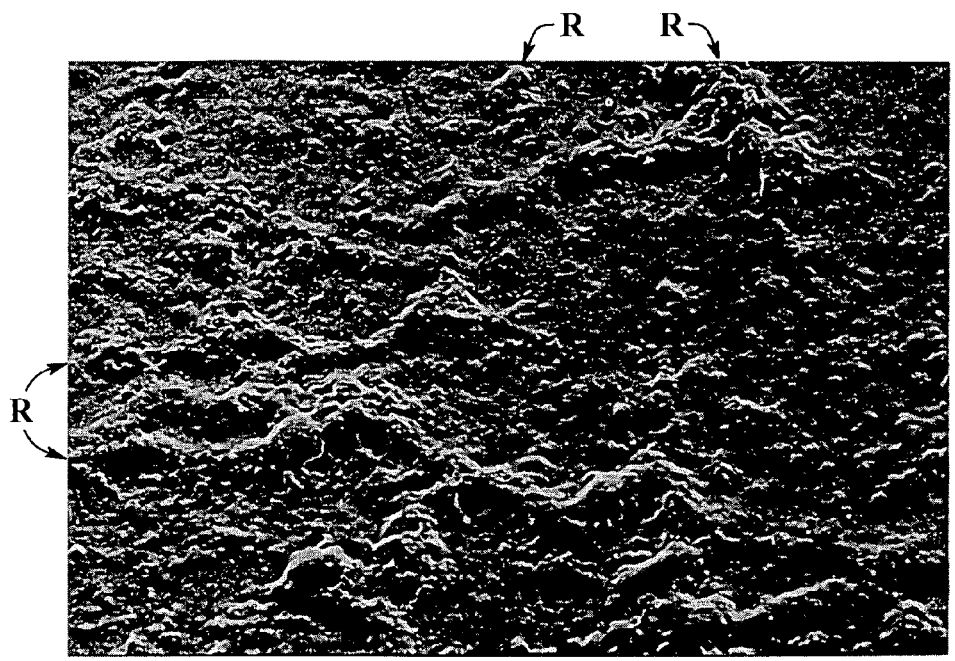
FIG. 23 is a scanning electron photomicrograph of a glove surface made according to the seventh embodiment of the present invention at a 0% stretch.
Figure 24:
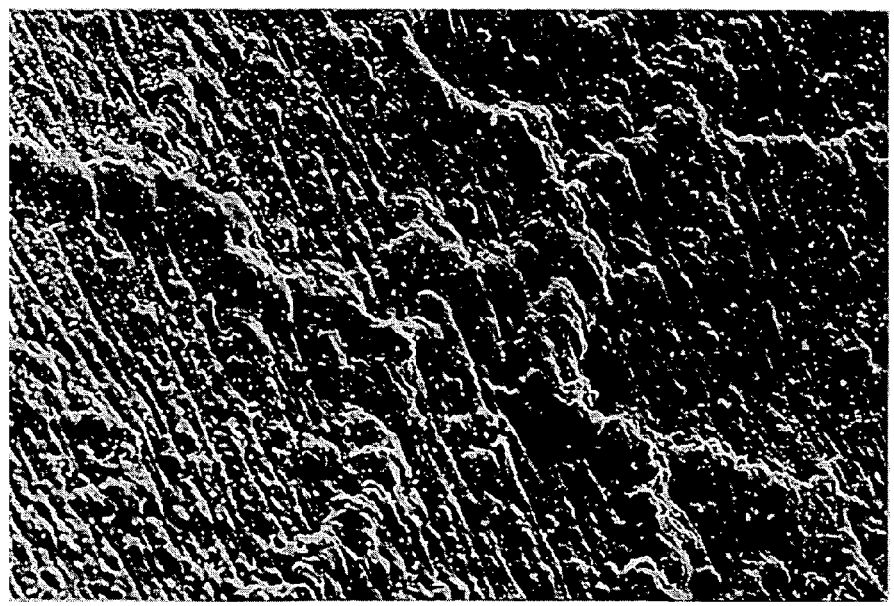
FIG. 24 is a scanning electron photomicrograph of a glove surface made according to the seventh embodiment of the present invention at a 500% stretch.
Figure 25:
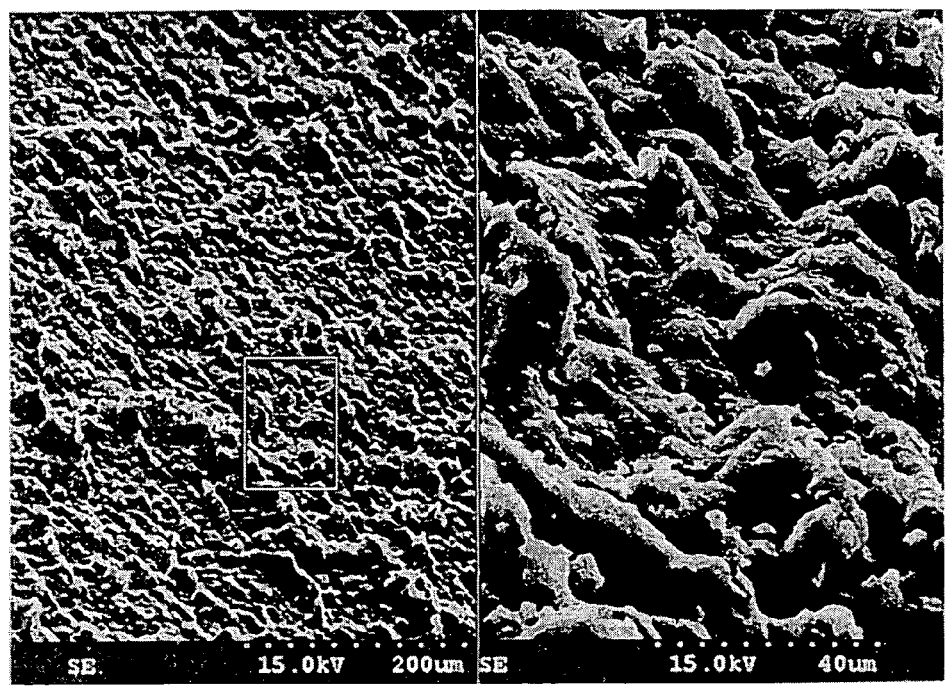
FIG. 25 is a scanning electron photomicrograph of a glove surface made according to the seventh embodiment of the present invention at 5×700%.
Figure 26:
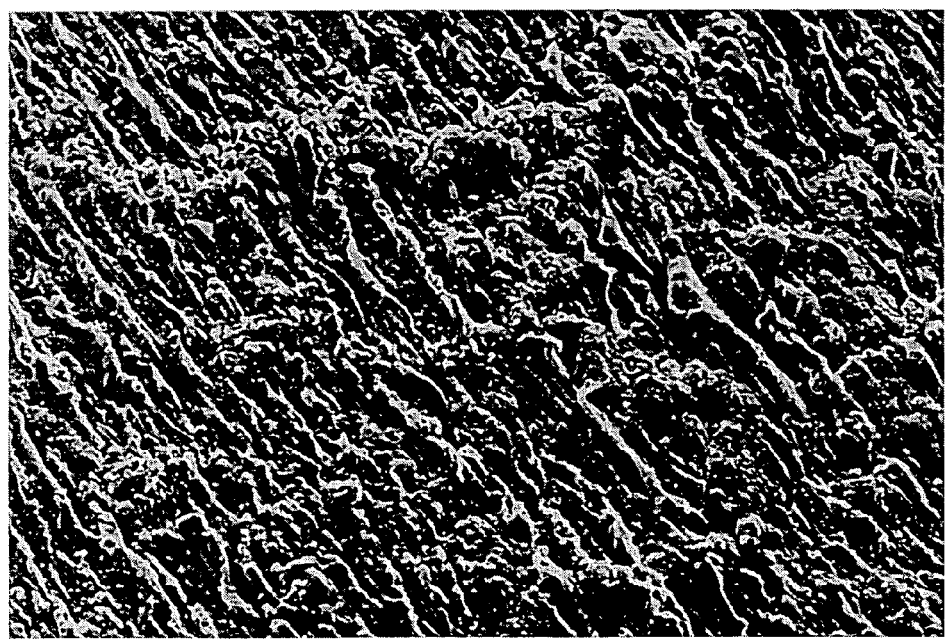
FIG. 26 is a scanning electron photomicrograph of a glove surface made according to the seventh embodiment of the present invention after break.

FIG. 15 illustrates a scanning electron photomicrograph of a glove surface made in the fourth embodiment of the present invention. As illustrated previously, ridges R define the domains on the glove surface. FIGS. 15–18 illustrate scanning electron photomicrographs of a glove surface as taken from a 0% stretch and continuously stretched through to the breaking point as shown in FIG. 18. As is illustrated, the domain formations on the glove surface remain even as the glove is stretched to the breaking point.

Accordingly, there is provided, in a fifth embodiment of the present invention, water, a polyurethane dispersion, an aqueous wax dispersion, a nonionic surfactant, an anionic surfactant and potassium hydroxide. In this particular embodiment of the present invention, the amount of polyurethane dispersion is relatively constant while the wax dispersion was decreased to test the effect on both domain formation and adhesion properties.

The fifth embodiment of a donning coating made according to the principles of the present invention, presenting a formulation useful as coating for the formation of domains on a glove surface is set forth in the table below:

TABLE 5

| Item | Ingredient | % Solids (w/w) | % Used |
|---|---|---|---|
| 1 | Water | — | Balance |
| 2 | Solucote 1088 | 35 | 3.0 |
| 3 | Aquamat 213 | 30 | 1.4 |
| 4 | Igepal CO-897 | 70 | 0.05 |
| 5 | Darvan WAQ | 66 | 0.03 |
| 6 | KOH (10%) | 10 | 0.12 |

Solucote 1088 is a conventional polyurethane dispersion available from Solvol Chemical Company, Warwick, R.I. Aquamat 213 is an aqueous wax dispersion that is suponified by the potassium hydroxide. Igepal CO-897 is a nonionic surfactant and Darvan WAQ is an anionic surfactant used as a stabilizer.

The results of the fifth embodiment of the present invention are illustrated in FIGS. 19–22. As illustrated, domain formation can be found at ridges, R. FIGS. 19–22 show the amount of domain formations at a 0% stretch through to the breaking point. The domains remain on the glove surface even as the glove is stretched to the breaking point.

A preferred embodiment of the present invention is illustrated by the sixth embodiment. There is provided, in the sixth embodiment, water, a polyurethane dispersion, an aqueous wax dispersion, a nonionic surfactant, an anionic surfactant and potassium hydroxide. In this particular embodiment of the present invention, the amount of polyurethane dispersion is increased significantly while the wax dispersion level was decreased and showed superior properties on both domain formation and adhesion properties.

The sixth embodiment of the donning coating made according to the principles of the present invention, presenting a formulation useful as coating for the formation of domains on a glove surface is set forth in the table below:

TABLE 6

| Item | Ingredient | % Solids (w/w) | % Used |
|---|---|---|---|
| 1 | Water | — | Balance |
| 2 | Solucote 1088 | 35 | 8.5 |
| 3 | Aquamat 213 | 30 | 2.0 |
| 4 | Igepal CO-897 | 70 | 0.05 |
| 5 | Darvan WAQ | 66 | 0.03 |
| 6 | KOH (10%) | 10 | 0.12 |

Solucote 1088 is a conventional polyurethane dispersion available from Solvol Chemical Company, Warwick, R.I. Aquamat 213 is an aqueous wax dispersion that is suponified by the potassium hydroxide. Igepal CO-897 is a nonionic surfactant and Darvan WAQ is an anionic surfactant used as a stabilizer.

The results of the sixth embodiment of the present invention are illustrated in FIGS. 23–26. As illustrated, domain formation can be found at ridges, R. FIGS. 23–26 show the amount of domain formations at a 0% stretch through to the breaking point. The domains remain on the glove surface even as the glove is stretched to the breaking point. As is illustrated, superior domain formations and adhesion properties are found.

It should be evident to those of ordinary skill in the art that while specific examples of the components of the coating of the present invention have been provided, equivalents of these components are within the scope of this disclosure. The composition may include, for example, an acrylic polymer, a polyurethane polymer, and a polyvinyl chloride polymer.

What is claimed is:

1. An aqueous coating composition for coating the interior surface of gloves comprising:
    an acrylic polymer dispersion;
    a polyurethane latex dispersion; and
    an agglomerated polyvinyl chloride latex;
wherein said agglomerated polyvinyl chloride latex forms domains of variable size and height enhancing wet donnability of the gloves.

2. The coating of claim 1 wherein the acrylic polymer is in an amount from about 0.1% to about 10% based on the total coating weight.

3. The coating of claim 1 wherein the polyurethane latex dispersion is in an amount from about 0.1% to about 10% based on the total coating weight.

4. The coating of claim 1 wherein the agglomerated polyvinyl chloride latex is in an amount from about 0.1% to about 10% based on the total coating weight.

5. An aqueous coating composition for coating the interior surface of gloves comprising:
    a styrene acrylic emulsion;
    an aqueous wax dispersion;
    a nonionic surfactant;
    an anionic surfactant; and
    potassium hydroxide;
wherein said styrene acrylic emulsion and said aqueous wax dispersion form domains of variable size and height enhancing wet donnability of the gloves.

6. The coating of claim 5 wherein the aqueous wax dispersion is a polyethylene wax.

7. The coating of claim 5 wherein the styrene acrylic emulsion is in an amount from about 0.1% to about 10% based on the total coating weight.

8. The coating of claim 5 wherein the aqueous wax dispersion is in an amount from about 0.1% to about 10% based on the total coating weight.

9. The coating of claim 5 wherein the nonionic surfactant is in an amount from about 0.0 1% to about 0.1% based on the total coating weight.

10. The coating of claim 5 wherein the anionic surfactant is in an amount from about 0.01% to about 0.1% based on the total coating weight.

11. The coating of claim 5 wherein the potassium hydroxide is present in an amount from about 0.0 1% to about 1.0% based on the total coating weight.

12. An aqueous coating composition for coating the interior surface of gloves comprising:
   a polyurethane latex dispersion;
   an aqueous wax dispersion;
   a nonionic surfactant;
   an anionic surfactant; and
   potassium hydroxide;
wherein said polyurethane latex dispersion and said aqueous wax dispersion form domains of variable size and height enhancing wet donnability of the gloves.

13. The coating of claim 12 wherein the aqueous wax dispersion is a polyethylene wax.

14. The coating of claim 12 wherein the polyurethane latex dispersion is in an amount from about 0.1% to about 10% based on the total coating weight.

15. The coating of claim 12 wherein the aqueous wax dispersion is in an amount from about 0.1% to about 10% based on the total coating weight.

16. The coating of claim 12 wherein the nonionic surfactant is in an amount from about 0.01% to about 0.1% based on the total coating weight.

17. The coating of claim 12 wherein the anionic surfactant is in an amount from about 0.01% to about 0.1% based on the total coating weight.

18. The coating of claim 12 wherein the potassium hydroxide is present in an amount from about 0.01% to about 1.0% based on the total coating weight.

19. A process for making a glove with enhanced wet donnability, the process comprising the steps of:
   applying a standard coagulant to a clean ceramic former in the shape of a hand;
   drying the standard coagulant, thus forming a coagulant coating on the former; dipping the former with the coagulant coating into compounded latex to form a rubber film on the former in the shape of a hand;
   leaching the rubber film by dipping the former with the rubber film in water;
   dipping the former with leached rubber film in an aqueous coating solution, the coating solution comprising:
      a styrene acrylic emulsion,
      an aqueous wax dispersion,
      a nonionic surfactant,
      an anionic surfactant, and
      potassium hydroxide,
   drying the coated rubber film to promote formation of domains in the coating on the interior surface of the glove; and
   curing the coated rubber film to form the glove.

20. A process for making a glove with enhanced wet donnability, the process comprising the steps of:
   applying a standard coagulant to a clean ceramic former in the shape of a hand;
   drying the standard coagulant, thus forming a coagulant coating on the former;
   dipping the former with the coagulant coating into compounded latex to form a rubber film on the former in the shape of a hand;
   leaching the rubber film by dipping the former with the rubber film in water;
   dipping the former with leached rubber film in an aqueous coating solution, the coating solution comprising:
      a polyurethane latex,
      an aqueous wax dispersion,
      a nonionic surfactant,
      an anionic surfactant, and
      potassium hydroxide,
   drying the coated rubber film to promote formation of domains in the coating on the interior surface of the glove; and
   curing the coated rubber film to form the glove.

21. A latex glove having a dry coating made by drying an aqueous coating composition on the interior surface of the glove, the aqueous coating comprising:
   an acrylic polymer dispersion;
   a polyurethane latex dispersion; and
   an agglomerated polyvinyl chloride latex;
wherein said agglomerated polyvinyl chloride latex forms domains of variable size and height enhancing wet donnability of the glove.

22. A latex glove having a dry coating made by drying an aqueous coating composition on the interior surface of the glove, the aqueous coating comprising:
   a styrene acrylic emulsion;
   an aqueous wax dispersion;
   a nonionic surfactant;
   an anionic surfactant; and
   potassium hydroxide;
wherein said styrene acrylic emulsion and said aqueous wax dispersion form domains of variable size and height enhancing wet donnability of the glove.

23. A latex glove having a dry coating made by drying an aqueous coating composition on the interior surface of the glove, the aqueous coating comprising:
   a polyurethane latex dispersion;
   an aqueous wax dispersion;
   a nonionic surfactant;
   an anionic surfactant; and
   potassium hydroxide;
wherein said polyurethane latex dispersion and said aqueous wax dispersion form domains of variable size and height enhancing wet donnability of the glove.

* * * * *

UNITED STATES PATENT AND TRADEMARK OFFICE
CERTIFICATE OF CORRECTION

PATENT NO. : 7,084,204 B2
APPLICATION NO. : 10/343551
DATED : August 1, 2006
INVENTOR(S) : Nile et al.

It is certified that error appears in the above-identified patent and that said Letters Patent is hereby corrected as shown below:

Column 2, line 41, "fifth" should read --fourth--.
Column 2, line 44, "fifth" should read --fourth--.
Column 2, line 47, "fifth" should read --fourth--.
Column 2, line 50, "fifth" should read --fourth--.
Column 2, line 53, "sixth" should read --fifth--.
Column 2, line 56, "sixth" should read --fifth--.
Column 2, line 59, "sixth" should read --fifth--.
Column 2, line 62, "sixth" should read --fifth--.
Column 2, line 66, "seventh" should read --sixth--.
Column 3, line 2, "seventh" should read --sixth--.
Column 3, line 5, "seventh" should read --sixth--.
Column 3, line 8, "seventh" should read --sixth--.

Signed and Sealed this

Twenty-third Day of January, 2007

JON W. DUDAS
*Director of the United States Patent and Trademark Office*